US005918216A

United States Patent [19]
Miksovsky et al.

[11] Patent Number: 5,918,216
[45] Date of Patent: Jun. 29, 1999

[54] AUTOMATIC RECOGNITION OF PERIODS FOR FINANCIAL TRANSACTIONS

[75] Inventors: Jan Thomas Miksovsky, Seattle; Manny S. Weiser, Redmond, both of Wash.

[73] Assignee: Microsoft Corporation, Redmond, Wash.

[21] Appl. No.: 08/701,444

[22] Filed: Aug. 22, 1996

[51] Int. Cl.[6] .................................................. G06F 17/60
[52] U.S. Cl. ................................. 705/35; 705/39
[58] Field of Search ................... 705/35, 1, 39, 705/30, 34, 40; 235/379, 385; 340/825.33; 382/137–140; 902/24

[56] References Cited

U.S. PATENT DOCUMENTS

| | | | |
|---|---|---|---|
| 4,992,940 | 2/1991 | Dworkin | 705/26 |
| 5,319,542 | 6/1994 | King, Jr. et al. | 705/27 |
| 5,515,268 | 5/1996 | Yoda | 705/26 |
| 5,649,115 | 7/1997 | Schrader et al. | 395/233 |

OTHER PUBLICATIONS

Giovetti, "Managing Your Money (MYM) for Windows version 2", Accounting Technology, v11n4 pp.13–18, Apr./May 1995, Dialog file 15, Accession No. 01030052.

Giovetti, Kiplinger's CA–Simply Money (personal finance software) (software review Evaluation), compute, v15, n11, p. 138(2), Nov. 1993, Dialog file 148, Accession No. 06745936.

Evelyn, "Andrew Tobias Managing Your Money", Computers & Electronics, v22, p. 48(2), Nov. 1984, Dialog file 148, Accession No. 02168557.

*Primary Examiner*—Frantzy Poinvil
*Attorney, Agent, or Firm*—Ronald M. Anderson

[57] ABSTRACT

A new financial transaction is compared to prior entries in a database of prior financial transactions to identify a recurring transaction. Certain parameters of a new entry, entered either manually or by transfer of electronic data, are compared to corresponding entries in the database of financial transactions to determine if at least two similar prior entries can be found. A set of predefined rules is applied to determine whether two prior transactions are substantially similar to the new transaction. If two prior transactions are found that are substantially similar to the new transaction, a first and a second gap are determined. The first gap corresponds to the time interval between the new and the most recent of the two prior similar transactions, and the second gap corresponds to the time interval between the two prior similar transactions. If the first and second gaps match one of a plurality of predetermined time periods within a preset tolerance value, a recurring transaction for that time period is identified. The user is prompted to enter the recurring transaction into a payment calendar. The payment calendar is then used for selectively entering new transactions and for financial planning over a selected future time frame.

27 Claims, 9 Drawing Sheets

AUTOMATIC RECOGNITION OF PERIODS FOR FINANCIAL TRANSACTIONS

FIELD OF THE INVENTION

This invention generally pertains to use of a computer for recognition of patterns in data, and more specifically, to entry of scheduled debit or credit transactions in financial data, where the debit or credit transactions recur at regular intervals of time.

BACKGROUND OF THE INVENTION

The increasing complexity of personal financial transactions has spurred the continuous development of various financial management tools. Historically, individuals have debited and credited their accounts by using drafts and negotiable instruments in writing (i.e., on paper), or by directly withdrawing funds from the particular banks where their accounts reside. Today, individuals enjoy many more options for transferring funds from accounts. For example, debits and credits can be performed with automated teller machines, electronic transfer of funds, credit cards, and debit cards. To facilitate the increased technological complexity of financial transactions, software programs have been developed that automate many of the steps necessary to record and organize personal and business finances.

Effective financial management programs must efficiently enable recordation or entry of an individual's various financial transactions. Generally, the software must track transactions and maintain balances for various accounts that are created by a user. Further, most such software programs enable an individual to calendar recurring transactions, such as payments to a utility, that are consistently made at the same time interval. Once a scheduled or calendared transaction has been entered by the user, the program will automatically prompt the user to enter the transaction in the financial data, while enabling the user to modify parameters such as the actual date of the payment or credit, or the amount of the transaction.

In the prior art financial management programs, the individual must identify and manually enter all recurring financial transactions into the program. Unfortunately, there are several inherent problems with this method. First, many users may not have the time to adequately learn the proper steps for entering recurring financial transactions and may not even know that the capability exists in the program to do so. Second, users may have difficulty identifying the transactions that are recurring. Lastly, users may not accurately enter the financial information for a recurring transaction, such as the name of the payee, the time period, the financial category, or the account.

There is an inherent difficulty in identifying similar transactions that recur at regular intervals of time. For example, a user may pay periodically recurring bills on different days of a month, even though such bills are typically due on about the same time each month. However, the due date of a bill can vary if the date falls on a weekend or a holiday. Any significant error in automatically identifying recurring financial transactions is likely to cause the user to ignore a suggestion to schedule a recurring transaction in response to a suggestion to do so by the financial management program. Accordingly, it is important to minimize the incidence of error in the automatic identification of such transactions.

SUMMARY OF THE INVENTION

A preferred embodiment of the present invention is implemented in Microsoft Corporation's Money for Windows 95™ program. This program is preferably distributed to end users on floppy disks, but may also be distributed via other media, such as on a compact disk-read only memory (CD-ROM) or electronically, over a network. When executed on a computer, the program compares each new financial transaction being entered, whether manually by user, or by electronic data transfer, to existing entries in a database of transactions in an attempt to detect any pattern of recurring transactions. The various aspects of the present invention, as defined by the claims, are discussed below.

In accordance with the present invention, a method is defined for recognizing a recurring financial transaction, using a computer. The method includes the step of entering a plurality of parameters of a financial transaction into the computer as a new entry in a transactions database. Next, the method provides for searching for at least two prior entries in the transactions database having selected parameters that are substantially similar to corresponding parameters of the new entry to determine whether the last entered transaction is a recurring transaction. If at least two such entries are found, time intervals between successive prior entries and the new entry are determined. The time intervals are then compared with a plurality of different predetermined time periods to identify any recurring financial transaction; each of the different predetermined time periods corresponds to a recurring financial transaction at a different time interval. If a recurring transaction is identified, the user is prompted to add the recurring financial transaction to a database of recurring transactions. If at least two such entries are not found or if a recurring transaction is not identified, processing of the new transaction continues.

The step of entering the plurality of parameters of the financial transaction includes the step of entering either a payee or payer, a financial category for the financial transaction, a date of the financial transaction, and an amount for the financial transaction.

Preferably, the method also includes the step of checking the database of recurring transactions to determine whether the new entry is already represented in the database of recurring transactions.

The step of determining the time intervals comprises the step of determining a first time gap between the new entry and the most recent of the prior entries from the transactions database and a second time gap between the most recent of the prior entries and a next older entry. Absolute values of differences between the first time gap and one of the plurality of the predetermined time periods, and between the second time gap and that one predetermined time period are determined. These differences are then compared to a predefined tolerance for each of the predetermined time periods. If both differences are less than the predefined tolerance for a predetermined time period, the method identifies the recurring financial transaction corresponding to the current predetermined time period.

The method also preferably prompts the user to add any recurring transaction to the database of recurring transactions, and employs a payment calendar to schedule the prompting of recurring transactions contained within the database of recurring transactions.

The step of entering of the plurality of parameters of the financial transaction includes one of several possible steps. Specifically, the user can manually enter the parameters, the parameters can be scanned from a data sheet, or can be entered from electronically transferred financial data.

In the preferred form of the invention, the user can selectively disable identification of recurring transactions.

This option can be selected, for example, if the user is not interested in being prompted to enter recurring financial transactions in the database of recurring financial transactions.

The step of determining the time intervals includes the step of repetitively comparing an absolute value of a difference between the first time gap and the second time gap to a predefined maximum value. As a function of a result of comparing the difference and the predefined maximum value, the method provides for discontinuing further attempts to identify the recurring financial transaction.

Another aspect of the present invention is directed to a media adapted for distribution of a computer program intended to be executed on a computer. The computer program enables recognition of a recurring financial transaction using functional steps generally consistent with the above-described method.

Yet another aspect of the present invention is directed to a system for recognizing a recurring financial transaction. The system includes a memory in which a plurality of machine instructions are stored, a display, and a processor that is coupled to the display and to the memory to access the machine instructions that are stored therein. When executed by the processor, the machine instructions cause the processor to implement functions that are also generally consistent with the steps of the above method.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
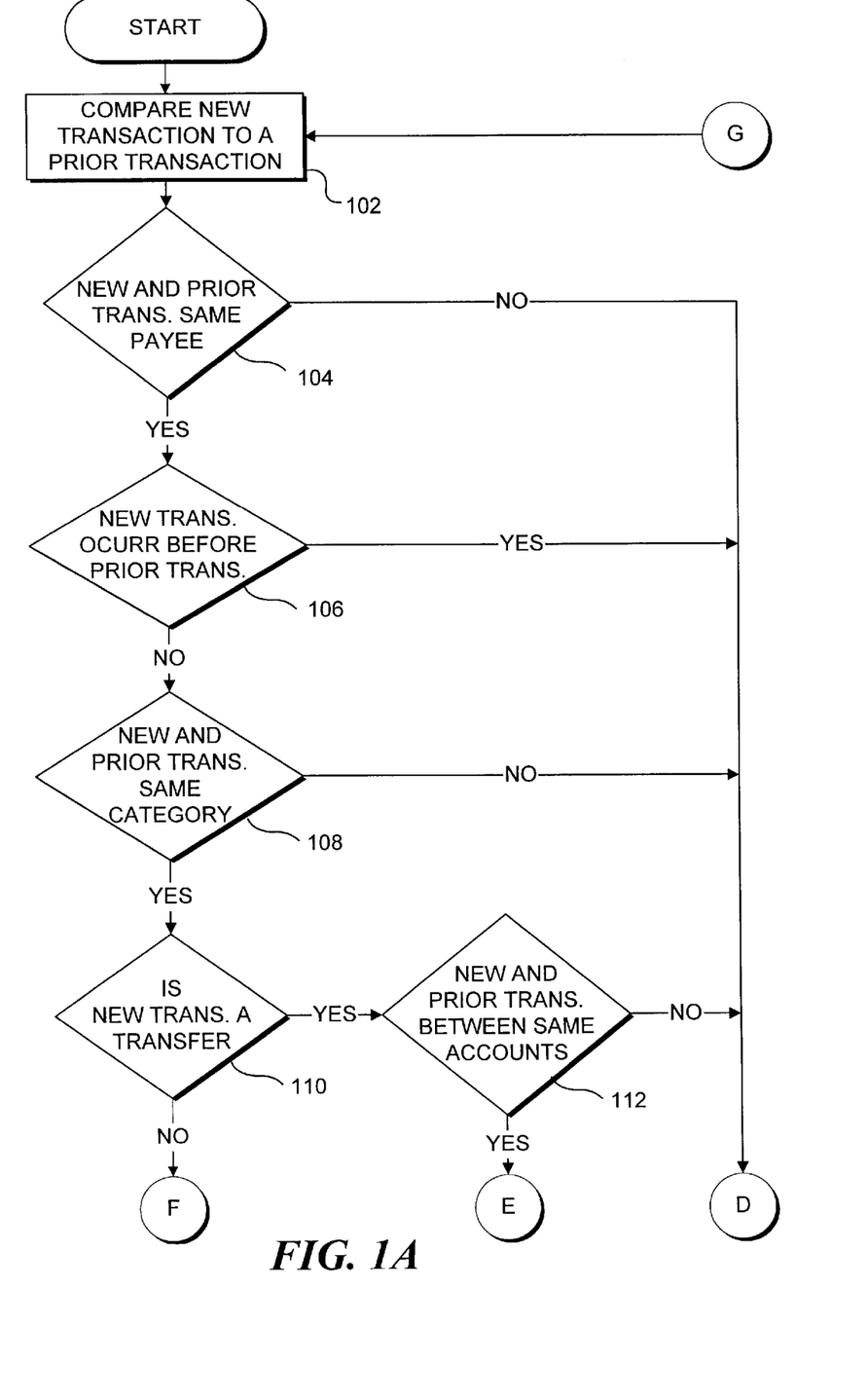
FIGS. 1A and 1B are flow charts showing the logical steps implemented in comparing a new financial transaction to a prior financial transaction in accordance with the present invention.
Figure 1B:
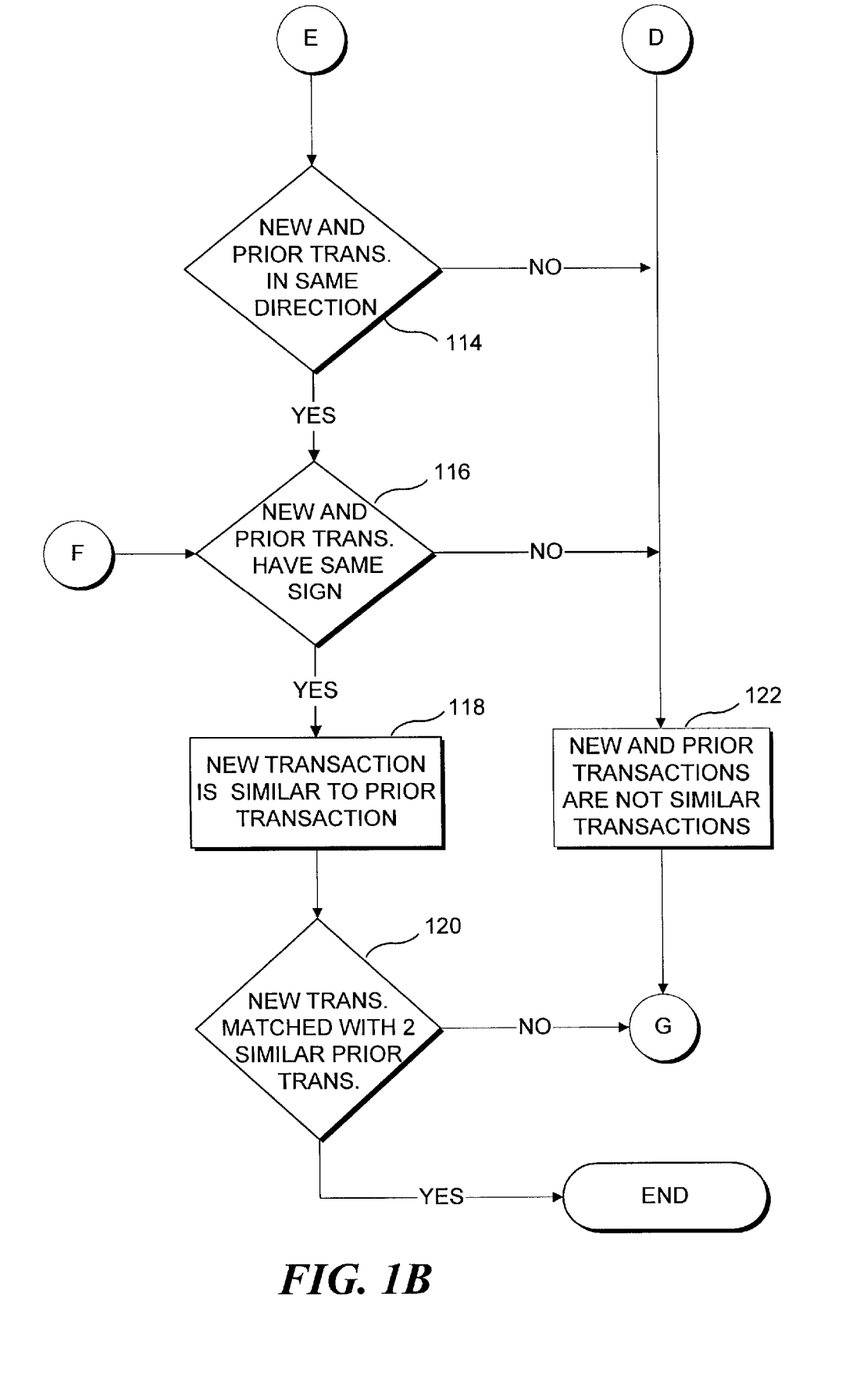

In FIGS. 1A and 1B, a flow chart illustrates the logical steps used in the present invention for determining if any previously entered (prior) transactions are substantially similar to a newly entered transaction. For the preferred embodiment of the present invention, the steps shown in these Figures are repeated until two prior transactions are found to be substantially similar to the new transaction, or all of the prior transactions have been checked. It should be noted that to simplify the disclosure of the present invention, reference is only made to transactions in which payment is made to the user by a payer. However, the present invention is equally applicable to automatically identifying financial transactions in which recurring payments from a payee are detected for entry into a calendar of recurring transactions. Thus, each time that reference is made to the term "payee," it is also intended that the term "payer" can be substituted, with the appropriate change in the absolute value of any related amounts of the transaction.

The logic begins at a block 102 where the newly entered financial transaction is compared to successive entries in a database of previously entered transactions. While the comparison to each entry is not specifically shown in the logic flow, it will be understand that the comparison compares each successively older transaction previously entered to the new transaction until either two similar transactions are identified or until all of the previously entered transactions have been evaluated, whichever occurs first. Each comparison proceeds as follows.

The logic first advances to a condition block 104, and determines whether a transaction in the database of prior transactions, i.e., the prior transaction currently being compared to the new transaction, has the same payee as the new transaction. If not, the logic steps to a block 122, and the transaction is determined to be dissimilar to the new transaction. Comparisons between that particular prior transaction and the new transaction then ceases, and the logic returns to block 102, so that the next older prior transaction can be compared with the new transaction. Once a prior transaction is identified as having the same payee (or payer), as noted in condition block 104, the logic proceeds to a condition block 106, where the transaction dates of the new and prior transactions are compared to determine whether the new transaction occurred before the prior transaction. If so, the logic returns to block 122, loads the next older transaction and advances again to condition block 104. However, if the new transaction is determined to be more recent than the prior transaction, the logic advances to a condition block 108. (It should be noted that transactions can be entered with dates that are in the future, relative to the actual date of the entry.) In condition block 108, the financial categories of the new and prior transactions are compared to determine if they match. If a match is not noted, the logic again returns to block 122. Conversely, the logic advances to a condition block 110 if the new and prior transactions have the same financial category.

At condition block 110, the logic flow branches depending upon whether the new transaction is a transfer of funds. If so, the logic advances to a condition block 112, and a determination is made as to whether the new and prior transactions are transfers of funds between the same accounts. If the new and prior transactions are not between the same accounts, the logic again returns to block 122 and the selected prior transaction is found to be dissimilar. Otherwise, the logic moves to a condition block 114. In this block, the new and prior transactions are compared to determine whether the transfer of funds moved in the same direction between the two different accounts. If not, the logic proceeds to block 122 and the prior transaction is determined to be dissimilar. However, if the new and prior transactions are transfers in the same direction between the accounts, the logic advances to a condition block 116. Further, if the new transaction was not determined to be a transfer of funds between accounts at condition block 110, the logic also steps to condition block 116.

At condition block 116, the new and prior transactions are checked to determine whether both comprise a debit or a credit of the account. Conventional notation associates debits with a negative sign and credits with a positive sign applied to the amount of the transaction. The sign associated with the amounts in the new and prior transactions are compared in condition block 116 to determine if they match. If the signs do not match, the logic drops to block 122 and the selected prior transaction is determined to be dissimilar to the new transaction. Alternatively, if the signs for the amounts of the new and prior transactions are determined to match, the logic moves to a block 118, in which the prior transaction is identified as substantially similar to the new transaction. Next, as provided in the preferred embodiment, the logic moves to a condition block 120 to determine whether at least two prior transactions substantially similar to the new transaction have been identified. If the number of substantially similar prior transactions that have been identified is less than two and if there are still transactions in the database of prior transactions that have not been selected for comparison to the new transaction, the logic loops back to block 102. Otherwise, there will be no further comparisons of the new transaction with prior transactions. Further, if two substantially similar prior transactions identified, the new and prior transactions will be stored for further processing, as described below. It should be noted that it is also contemplated that the program can be modified to attempt to identify more than two prior transactions, so that additional data can be evaluated in identifying a recurring transaction. Additional information derived from identifying more than two similar prior transactions could be employed in further minimizing errors in the process; however, it has been shown that using only two similar prior transactions yields acceptable results, i.e., results having an acceptably low error rate.

Figure 2A:
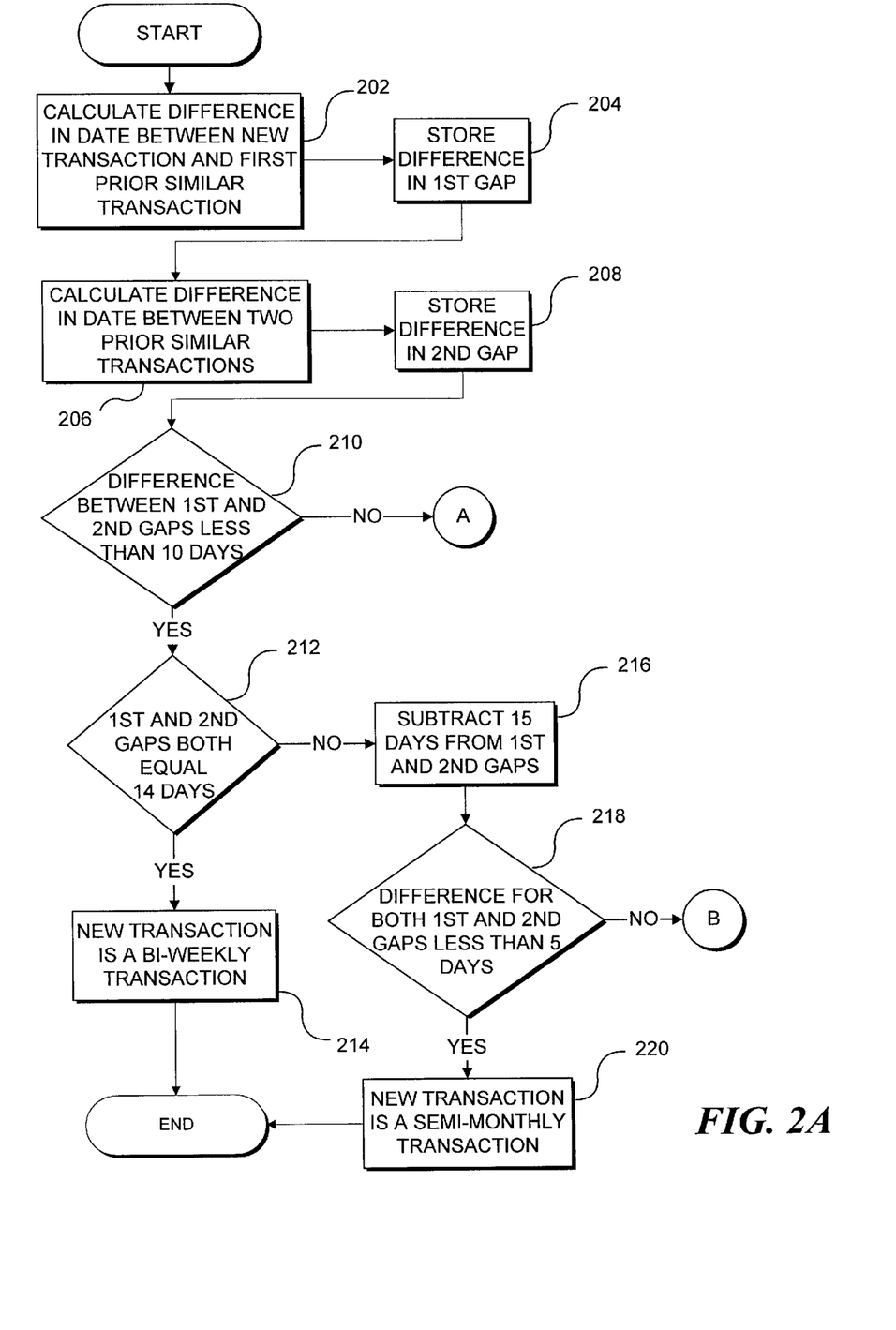
FIGS. 2A, 2B, and 2C are flow charts showing the logical steps implemented in determining if a new transaction and two similar prior transactions occur at time intervals corresponding to one of a plurality of different predetermined time periods.
Figure 2B:
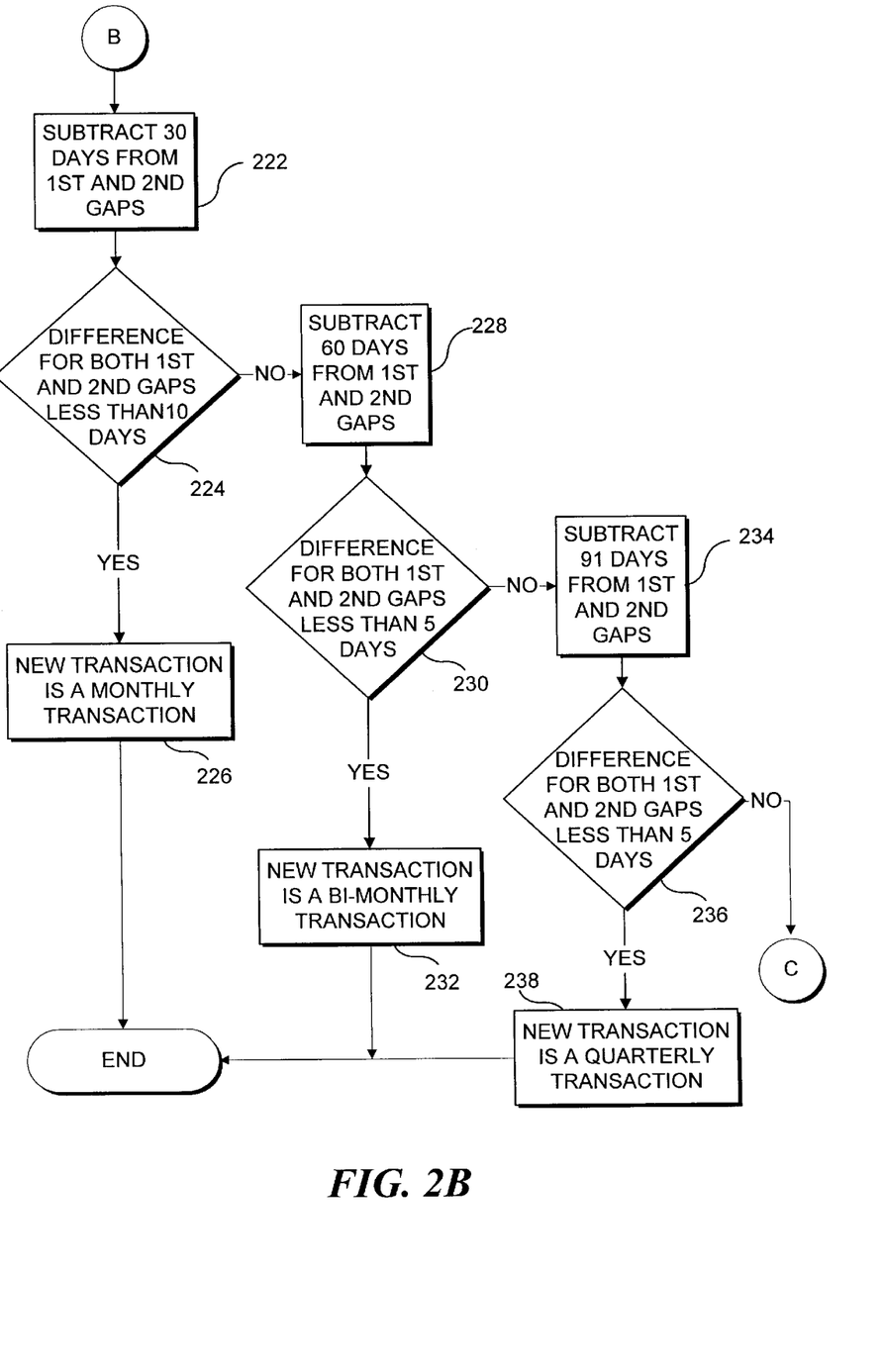
Figure 2C:
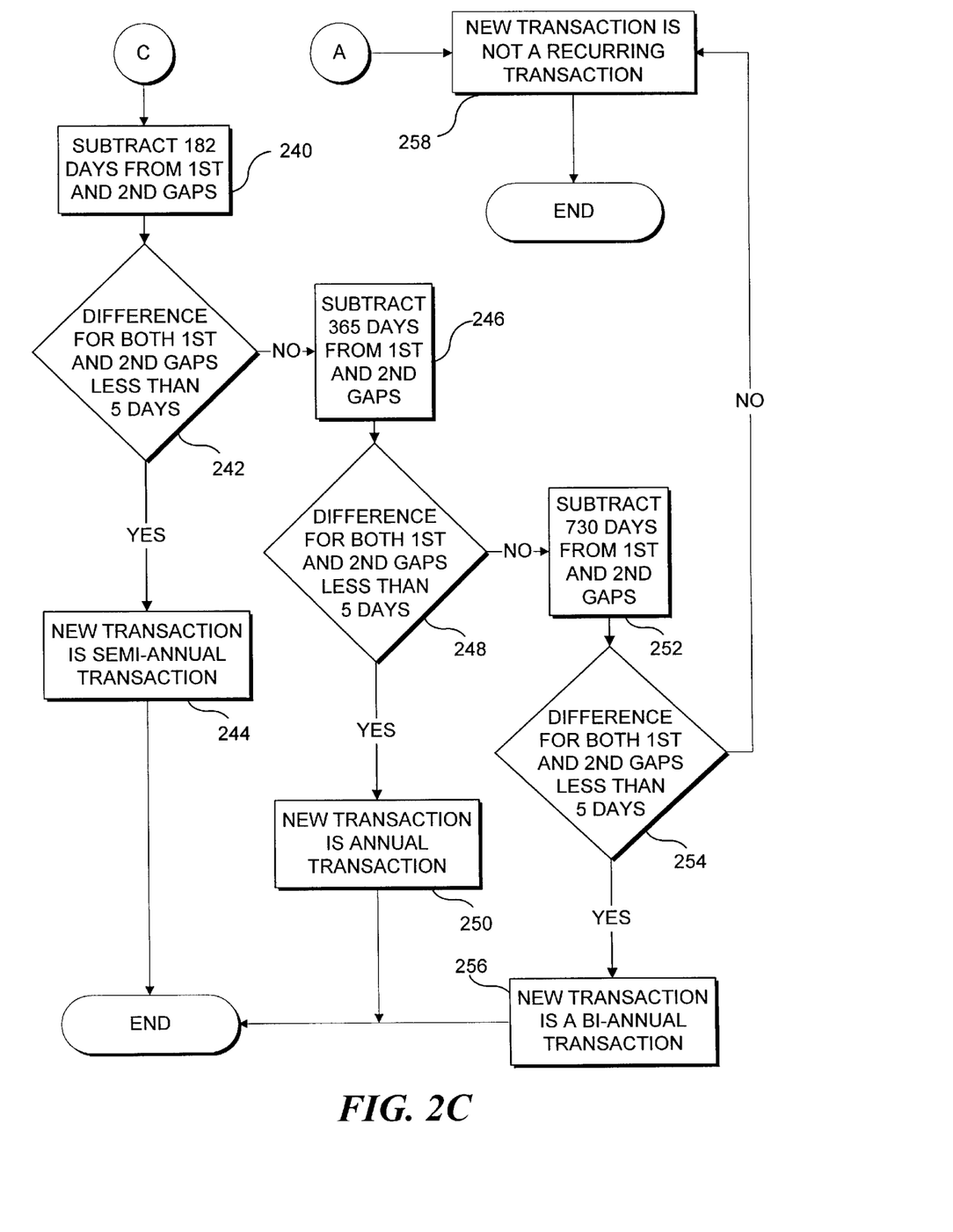

Once two prior transactions have been determined to be substantially similar to the new transaction, the preferred embodiment determines the appropriate recurring date interval of the new transaction, as shown by the logic of FIGS. 2A, 2B, and 2C. The logic flow advances from the start to a block 202, where the time difference between the new transaction and the first substantially similar prior transaction (i.e., the most recent of the two substantially similar prior transactions) is determined. The logic advances to a block 204 where the difference is stored as a "first gap." The logic moves to a block 206 where the time difference between the two substantially similar prior transactions is calculated. In a block 208, this difference is stored as a "second gap." Subsequently, the logic moves to a condition block 210 where the difference between the first and second time gaps is calculated. If the result of the calculation in block 210 is found to be more than a predetermined time, which is ten days in the preferred embodiment, the logic proceeds to a block 258. At block 258, the new transaction is determined to represent a non-recurring transaction and further processing of the new transaction and its two substantially similar prior transactions to identify a recurring transaction ceases.

Conversely, if the difference between the first time gap and the second time gap is less than ten days (in the preferred embodiment), the logic moves to a condition block 212 to determine whether the first and second gaps both equal 14 days. If true, the logic advances to a block 214, the new transaction is determined to represent a bi-weekly recurring transaction, and there are no further comparisons regarding the new transaction. However, if the first and second gaps do not equal 14 days, the logic proceeds to a block 216, where a predetermined semi-monthly value of 15 days is subtracted from each of the first and second gaps, yielding two semi-monthly differences. Next, the logic moves to a condition block 218 and the semi-monthly differences are compared to a semimonthly predetermined tolerance value for this time period, which in the preferred embodiment is equal to five days. If both of the semi-monthly differences are less than the semi-monthly predetermined tolerance value, the logic advances to a block 220, the new transaction is determined to represent a recurring semi-monthly transaction, and further processing for this purpose terminates.

Alternatively, if either of the semi-monthly differences is determined to be equal to or greater than the semi-monthly predetermined tolerance value, the logic flow moves to a block 222. In block 222, a predetermined monthly value of 30 days is subtracted from each of the first and second gaps, yielding monthly differences for each. The logic advances to a condition block 224, and both of the monthly differences are compared to a monthly predetermined tolerance value, which is ten days in the preferred embodiment. If the monthly differences are both less than the monthly predetermined tolerance value, the logic advances to a block 226, and the new transaction is determined to represent a recurring monthly transaction. Alternatively, if the monthly differences are found to be equal to or greater than the monthly predetermined tolerance value, the logic moves to a block 228. In block 228, a predetermined bi-monthly value of 60 days is subtracted from each of the first and second gaps yielding bi-monthly differences. Next, the logic proceeds to a condition block 230 in which the bi-monthly differences are compared to a bi-monthly predetermined tolerance value (equal to five days in the preferred embodiment). If both of the bi-monthly differences are less than the bi-monthly predetermined tolerance value, the logic advances to a block 232, and the new transaction is determined to represent a recurring bi-monthly transaction. However, when either of the bi-monthly differences is equal to or greater than the bi-monthly predetermined tolerance value, the logic moves to a block 234 from condition block 230.

In block 234, a predetermined quarterly value of 91 days is subtracted from each of the first and second gaps, yielding quarterly differences. The logic moves to a condition block 236 in which the differences are compared to a quarterly predetermined tolerance value, which is also preferably five days. If the quarterly differences are both less than the tolerance value, the logic advances to a block 238. In block 238, the new transaction is determined to represent a recurring quarterly transaction, and further processing of the new transaction for this purpose is ended.

In contrast, if either of the quarterly differences are equal to or greater than five days, the logic advances to a block 240. A predetermined semi-annual value of 182 days is subtracted from each of the first and second gaps, yielding semi-annual differences. The logic advances to a condition block 242, in which the semi-annual differences are compared to a semi-annual predetermined tolerance value, which is preferably equal to five days. If both differences are less than the semi-annual predetermined tolerance value, the logic steps to a block 244. The new transaction is then determined to represent a semi-annual transaction and further processing for this purpose concludes. Alternatively, if either of the semi-annual differences is equal to or greater than the tolerance value, the logic steps to a block 246.

As indicated in block 246, a predetermined annual value of 365 days is subtracted from each of the first and second gaps, to determine annual differences. The logic then advances to a condition block 248, and in this block, the annual differences are compared to an tolerance value, which is also equal to five days in the preferred embodiment.

If both of the annual differences are less than the annual predetermined tolerance value, the logic flow advances to a block 250. In block 250, the new transaction is determined to represent a recurring annual transaction, terminating the process. Conversely, if either of the annual differences is equal to or greater than the annual predetermined tolerance value, the logic proceeds to a block 252. Block 252 provides for subtracting a predetermined bi-annual value of 730 days from each of the first and second gaps, producing bi-annual differences. The logic then continues with a condition block 254 in which the bi-annual differences are compared to a bi-annual predetermined tolerance value (again equal to five days in the preferred embodiment). If the bi-annual differences are both less than five days, the logic flows to a block 256, in which the new transaction is determined to represent a bi-annual transaction, so that no further processing for this purpose is required. Conversely, if either bi-annual difference is greater than or equal to the bi-annual predetermined tolerance value, the logic advances to block 258. As noted above, in block 258, the new transaction is determined to represent a non-recurring transaction, so that further processing to identify any recurring transaction is terminated.

Examples of Graphical User Interface Related to the Present Invention

Figure 3:
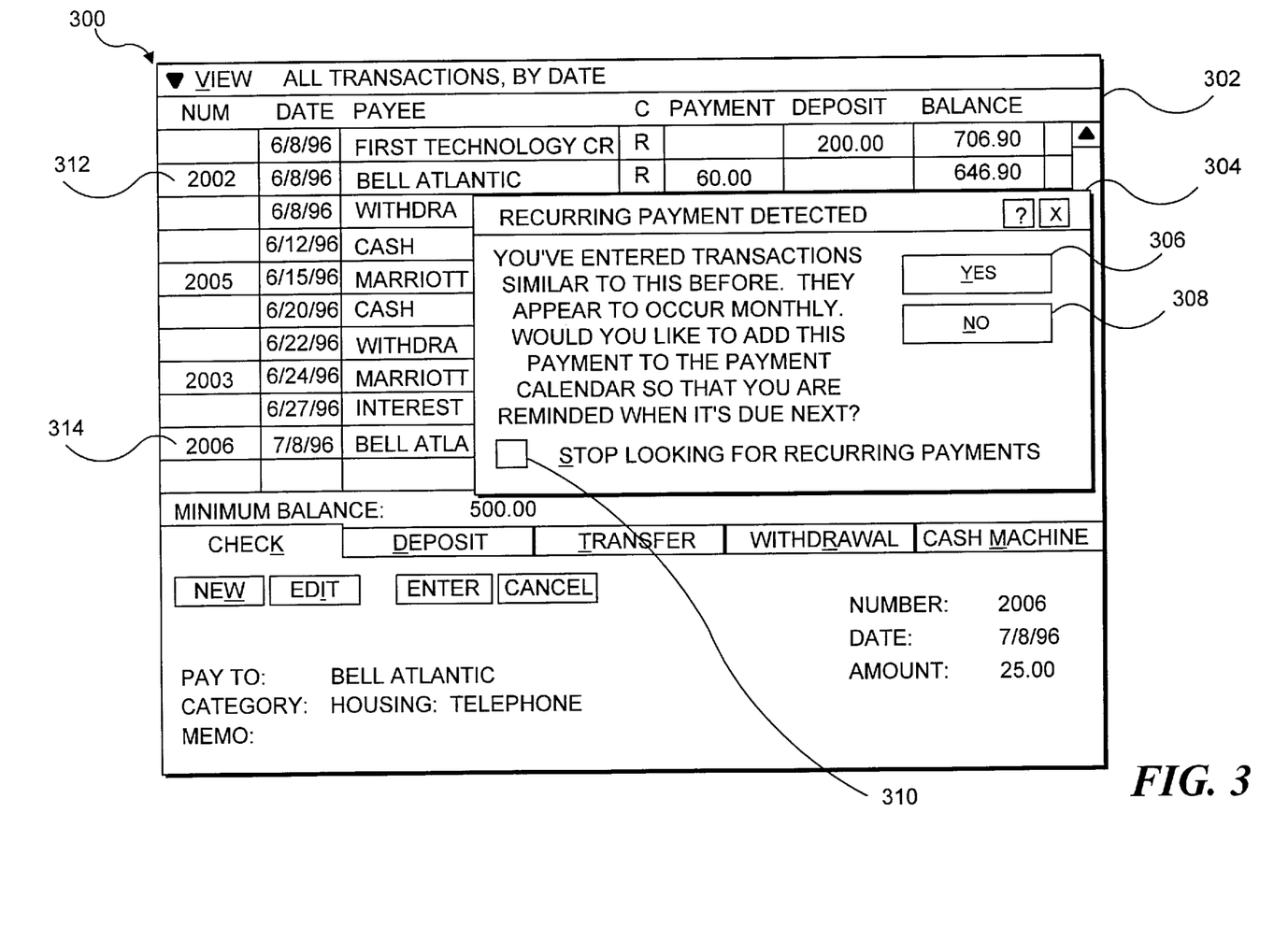
FIG. 3 illustrates an exemplary window of Microsoft Corporation's Money for Windows 95™, showing a dialog box that prompts a user to enter a detected recurring transaction in a scheduled payment calendar.
Figure 5:
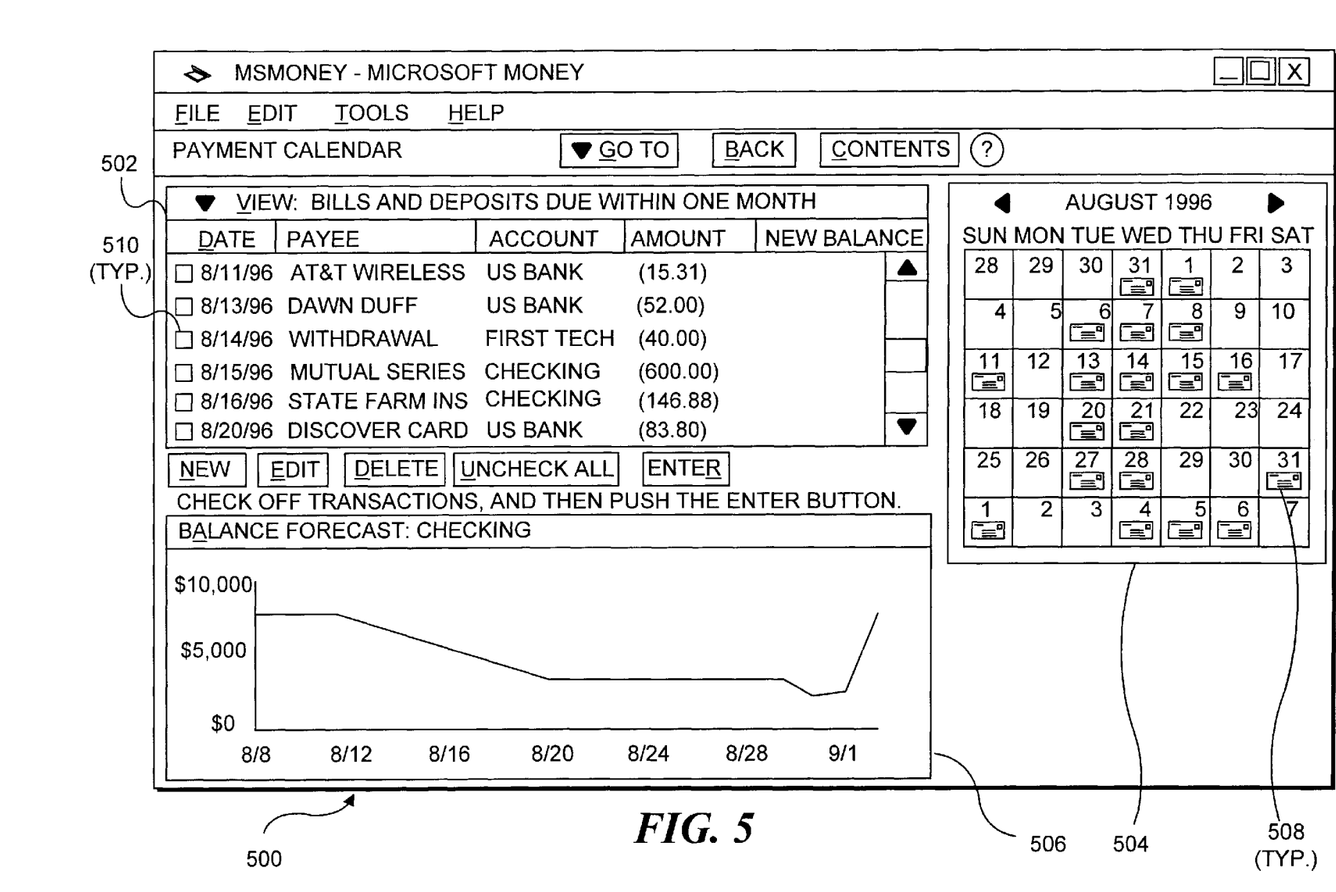
FIG. 5 illustrates an exemplary payment calendar window.

Once a recurring transaction has been identified as described above, the program employs a graphical user interface for prompting the user to permit entering the recurring transaction in a payment calendar. With reference to FIG. 3, a window 300 is illustrated in which financial transactions that have previously been entered are displayed for review and editing by the user. User entries into this database of financial transactions are made horizontally; a row 302 lists the fields associated with a checking account transaction database. These fields include the check number, date, payee (or payer), financial category, payments (debits), deposits (credits) and the current account balance, which the program automatically updates after each entry. An exemplary row 312 shows a prior entry for a check number 2002, while a row 314 shows a new entry for a check number 2006. Not shown is a still older entry which the program has used in identifying a recurring monthly transaction for the payee of check 2006. A pop-up dialog box 304 is displayed as a result of the program identifying the recurring monthly transaction to provide the user with the opportunity to selectively add the identified recurring monthly to a payment calendar 500, as illustrated in FIG. 5, by way of example. Further, in pop-up dialog box 304, the user is given the option of disabling the detection of any recurring transactions or payments, by entering a check mark in a box 310.

Figure 4:
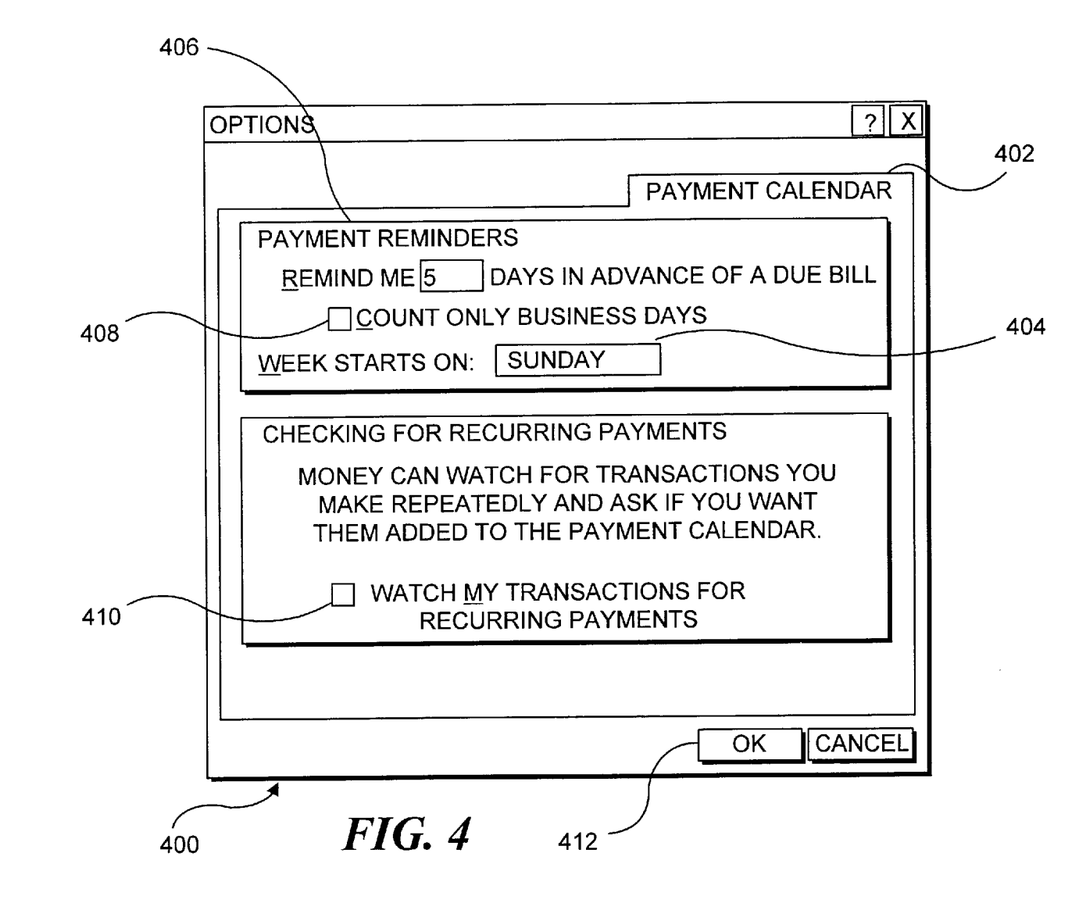
FIG. 4 illustrates an exemplary option dialog box for the payment calendar.

If the user selects a "Yes" button 306, the program displays a dialog box 400, as shown in FIG. 4. In a payment calendar options area 402 of the dialog box, the user is presented with several choices. The user can selectively enter the number of days in advance to be notified of a recurring transaction in a box 406. A check mark selectively entered by the user in a box 408 causes the payment period to be determined only by counting business days. Also, the user can selectively enter the day of the week (typically either Sunday or Monday) on which each week should start, in a box 404. Further, a check mark entered by the user in a box 410 causes the program to monitor new entries in the future to detect any further recurring transactions. Finally, if the user selects an OK button 412, the options selected by the user in connection with the payment calendar are saved.

In FIG. 5, exemplary payment calendar 500 is illustrated. There are three major areas within payment calendar 500. In a view area 502, all of the bills and deposits that are due within one month are displayed. Typically, the user selects a box 510 adjacent to a financial transaction to select it as a recurring transaction that should be entered in the database of transactions. Optionally, the user can selectively manually enter a new transaction in this list, edit an existing transaction, delete any transaction, uncheck all checked entries, and accept all checked entries, simply by selecting the corresponding control button for the desired action, all of which are disposed below the listed transactions. In a view area 504, a graphical user representation of a monthly calendar is shown. In the monthly calendar, a graphical symbol 508 appears on the rectangles of each of the days on which a recurring transaction is scheduled. Further, a view area 506 displays a graph that forecasts the future balances of accounts, taking into consideration the scheduled recurring transactions. Using the information shown in FIG. 5, the user can visually see how scheduled transactions will impact on the account balance during the subsequent month (or other selected time period). Further, the program can use the scheduled recurring transactions to prompt a user who is about to pay sums that will likely leave a negative balance if future scheduled transactions are enacted. Since the present invention automatically identifies and proposes entry of any recurring transaction identified, it is much more efficient and places less burden on the user to develop the database of recurring transactions shown in view area 502, than simply depending upon the user to manually enter all such transactions.

System for Implementing the Present Invention

Figure 6:
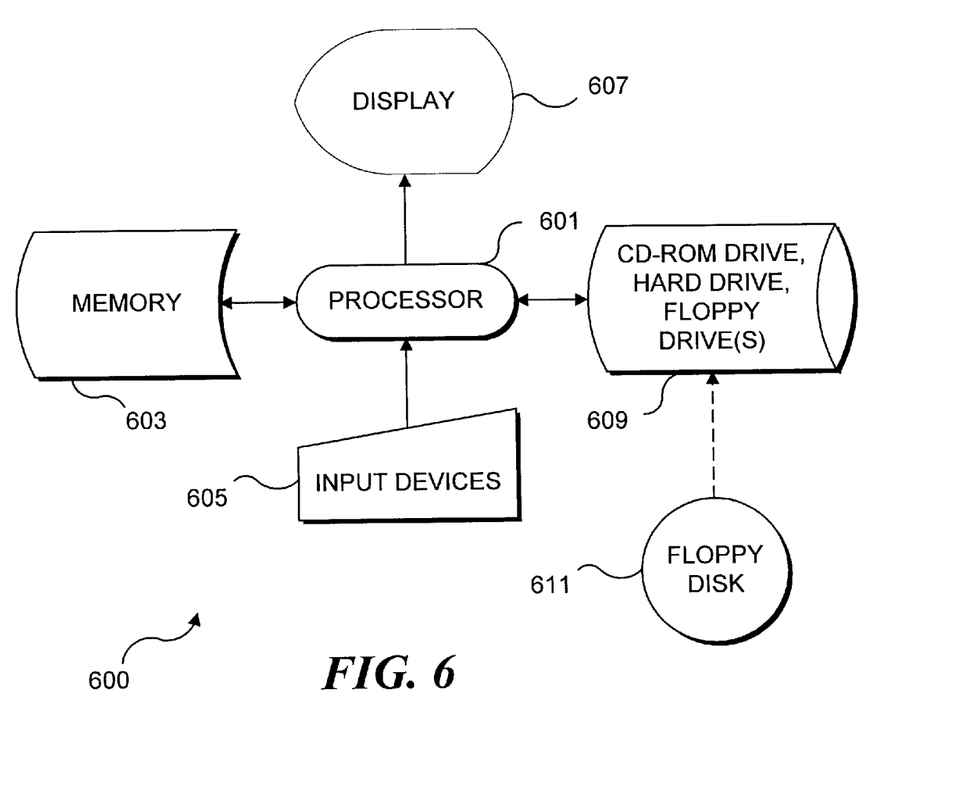
FIG. 6 is a block diagram of a conventional computer system suitable for executing machine language steps to implement the present invention.

It is likely that software comprising machine instructions used to implement the present invention will be distributed either over a network or stored on a non-volatile storage media such as a floppy disk or a compact disk-read only memory (CD-ROM) disk for distribution to end users. As indicated in FIG. 6, a floppy disk 611 on which are stored machine instructions appropriate to cause a processor 601 to implement the logic of the present invention as discussed above can be loaded into a floppy disk drive 609 and stored on the hard drive of a personal computer 600. When the program comprising these machine instructions is executed by computer 600, the machine instructions are loaded in a memory 603, which includes random access memory RAM (not separately shown). User interaction with the program is provided through input devices 605, which include a keyboard and a mouse or other pointing device (also not separately shown). The financial transaction data and recurring transaction data are stored in memory 603 and on the hard drive, so that the data can be presented on a display 607, in the views described above.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A computer implemented method for recognizing a recurring financial transaction, comprising the steps of:
   (a) entering a plurality of parameters of a financial transaction into the computer as a new entry in a transactions database;
   (b) searching for at least two prior entries in the transactions database having selected parameters that are substantially similar to corresponding parameters of the new entry; and (c) if said at least two prior entries are found:
  (i) determining time intervals between successive ones of said at least two prior entries and said new entry; and
  (ii) comparing the time intervals with a plurality of different predetermined time periods to identify any recurring financial transaction, each of the different predetermined time periods corresponding to a recurring financial transaction at a different time interval.

2. The method of claim 1, wherein the step of entering the plurality of parameters of the financial transaction comprises the steps of entering:
  (a) one of a payee and payer;
  (b) a financial category for the financial transaction;
  (c) a date of the financial transaction;
  (d) an amount for the financial transaction; and
  (e) a financial status for the financial transaction.

3. The method of claim 1, further comprising the step of checking a database of recurring transactions to determine whether the new entry is already represented therein.

4. The method of claim 1, wherein the step of determining the time intervals comprises the steps of:
  (a) determining a first time gap between the new entry and the most recent of said at least two entries from the transactions database;
  (b) determining a second time gap between the most recent of said at least two entries and a next older entry of said at least two entries;
  (c) repetitively comparing absolute values of differences between the first time gap and one of the plurality of the predetermined time periods, and between the second time gap and said one of the plurality of predetermined time periods, to a predefined tolerance; and
  (d) if both differences are within the predefined tolerance, identifying said one predetermined time period as the time period of the recurring transaction, but if either difference is not within the tolerance, repeating (c) and (d) for a different one of the predetermined time periods until all of the plurality of predetermined time periods have been compared to said differences.

5. The method of claim 1, further comprising the step of prompting the user to add any recurring transaction identified to a database of recurring transactions.

6. The method of claim 1, wherein the step of entering the plurality of parameters of the financial transaction comprises one of the steps of:
  (a) the user manually entering the parameters;
  (b) scanning the parameters from a data sheet; and
  (c) entering the parameters from electronically transferred financial data.

7. The method of claim 1, wherein the predetermined time periods have a predetermined tolerance value.

8. The method of claim 1, further comprising the step of enabling the user to selectively disable identification of recurring transactions.

9. The method of claim 1, wherein the step of determining the time intervals comprises the steps of:
  (a) determining a first time gap between the new entry and the most recent of said at least two entries from the transactions database;
  (b) determining a second time gap between the most recent of said at least two entries and a next older entry of said at least two entries;
  (c) repetitively comparing an absolute value of a difference between the first time gap and the second time gap to a predefined maximum value; and
  (d) as a function of a result of comparing said difference and said predefined maximum value, discontinuing attempting to identify the recurring financial transaction.

10. An article of manufacture adapted for distribution of a computer program, to enable the computer program to be executed on a computer, said computer program enabling a recognition of a recurring financial transaction when the computer program is executed by a computer, comprising:
  (a) a memory media; and
  (b) a plurality of machine instructions comprising the computer program, which are stored on the memory media, said plurality of machine instructions when executed by a computer, causing the computer to:
    (i) enable a user to enter a plurality of parameters of a financial transaction into the computer as a new entry in a transactions database;
    (ii) search for at least two prior entries in the transactions database having selected parameters that are substantially similar to corresponding parameters of the new entry; and
    (iii) if said at least two prior entries are found:
      (A) determining time intervals between successive ones of said at least two prior entries and said new entry; and
      (B) comparing the time intervals with a plurality of different predetermined time periods to identify any recurring financial transaction, each of the different predetermined time periods corresponding to a recurring financial transaction at a different time interval.

11. The article of manufacture of claim 10, wherein the plurality of parameters of the financial transaction comprise:
  (a) one of a payee and payer;
  (b) a financial category for the financial transaction;
  (c) a date of the financial transaction;
  (d) an amount for the financial transaction; and
  (e) a financial status for the financial transaction.

12. The article of manufacture of claim 10, wherein the machine instructions, when executed by the computer, further cause the computer to check a database of recurring transactions to determine whether the new entry is already represented therein.

13. The article of manufacture of claim 10, wherein the machine instructions, when executed by the computer, cause the computer to determine the time intervals by:
  (a) determining a first time gap between the new entry and the most recent of said at least two entries from the transactions database;
  (b) determining a second time gap between the most recent of said at least two entries and a next older entry of said at least two entries;
  (c) repetitively comparing absolute values of differences between the first time gap and one of the plurality of the predetermined time periods, and between the second time gap and said one of the plurality of predetermined time periods, to a predefined tolerance; and
  (d) if both differences are within the predefined tolerance, identifying said one predetermined time period as a time period of the recurring transaction, but if either difference is not within the tolerance, repeating (c) for a different one of the predetermined time periods until all of the plurality of predetermined time periods have been compared to said differences.

14. The article of manufacture of claim 10, wherein the machine instructions, when executed by the computer, cause the computer to prompt the user to add any recurring transaction identified to a database of recurring transactions.

15. The article of manufacture of claim 10, wherein the machine instructions, when executed by the computer, cause the computer to enter the plurality of parameters of the financial transaction by one of:

(a) enabling the user to manually enter the parameters;

(b) scanning the parameters from a data sheet; and (c) electronically transferring financial data that include the parameters.

16. The article of manufacture of claim 10, wherein the predetermined time periods have a predetermined tolerance value.

17. The article of manufacture of claim 10, wherein the machine instructions, when executed by the computer, cause the computer to enable the user to selectively disable identification of recurring transactions.

18. The article of manufacture of claim 10, wherein the machine instructions, when executed by the computer, cause the computer to:

(a) determine a first time gap between the new entry and the most recent of said at least two entries from the transactions database;

(b) determine a second time gap between the most recent of said at least two entries and a next older entry of said at least two entries;

(c) repetitively compare an absolute value of a difference between the first time gap and the second time gap to a predefined maximum value; and (d) as a function of a result of comparing said difference and said predefined maximum value, discontinue attempting to identify the recurring financial transaction.

19. A system for recognizing a recurring financial transaction, comprising:

(a) a memory in which a plurality of machine instructions are stored;

(b) a display; and (c) a processor that is coupled to the memory to access the machine instructions and to the display, said processor executing said machine instructions implementing a plurality of functions, including:

(i) enabling a user to enter a plurality of parameters of a financial transaction into the computer as a new entry in a transactions database;

(ii) searching for at least two prior entries in the transactions database having selected parameters that are substantially similar to corresponding parameters of the new entry; and (iii) if said at least two prior entries are found:

(A) determining time intervals between successive ones of said at least two prior entries and said new entry; and (B) comparing the time intervals with a plurality of different predetermined time periods to identify any recurring financial transaction, each of the different predetermined time periods corresponding to a recurring financial transaction at a different time interval.

20. The system of claim 19, wherein the plurality of parameters of the financial transaction comprise:

(a) one of a payee and payer;

(b) a financial category for the financial transaction;

(c) a date of the financial transaction;

(d) an amount for the financial transaction; and (e) a financial status for the financial transaction.

21. The system of claim 19, wherein said functions further include checking a database of recurring transactions to determine whether the new entry is already represented therein.

22. The system of claim 19, wherein the function of determining the time intervals includes the functions of:

(a) determining a first time gap between the new entry and the most recent of said at least two entries from the transactions database;

(b) determining a second time gap between the most recent of said at least two entries and a next older entry of said at least two entries;

(c) repetitively comparing absolute values of differences between the first time gap and one of the plurality of the predetermined time periods, and between the second time gap and said one of the plurality of predetermined time periods, to a predefined tolerance; and (d) if both differences are within the predefined tolerance, identifying said one predetermined time period as the time period of the recurring transaction, but if either difference is not within the tolerance, repeating (c) for a different one of the predetermined time periods until all of the plurality of predetermined time periods have been compared to said differences.

23. The system of claim 19, wherein said functions further include prompting the user to add any recurring transaction to a database of recurring transactions.

24. The system of claim 19, wherein the plurality of parameters of the financial transaction are entered by one of the following:

(a) manually entered by the user;

(b) scanned from a data sheet; and (c) entered from electronically transferred financial data.

25. The system of claim 19, wherein the predetermined time periods have a predetermined tolerance value.

26. The system of claim 19, wherein the machine instructions, when executed by the processor, cause the processor executing said machine instructions to enable the user to selectively disable the identification of recurring transactions.

27. The system of claim 19, wherein the machine instructions, when executed by the processor, cause the processor executing said machine instructions to:

(a) determine a first time gap between the new entry and the most recent of said at least two entries from the transactions database;

(b) determine a second time gap between the most recent of said at least two entries and a next older entry of said at least two entries;

(c) repetitively compare an absolute value of a difference between the first time gap and the second time gap to a predefined maximum value; and (d) as a function of a result of comparing said difference and said predefined maximum value, discontinue attempting to identify the recurring financial transaction.

* * * * *